United States Patent [19]

Quick

[11] 4,204,491
[45] May 27, 1980

[54] MOBILE PLANTING APPARATUS

[75] Inventor: Donald J. Quick, Bundaberg, Australia

[73] Assignee: Massey-Ferguson Services N.V., Curacao, Netherlands Antilles

[21] Appl. No.: 891,420

[22] Filed: Mar. 29, 1978

[30] Foreign Application Priority Data

Apr. 7, 1977 [GB] United Kingdom ............... 14700/77
Jul. 12, 1977 [GB] United Kingdom ............... 29146/77

[51] Int. Cl.² ........................... A01C 7/00; A01C 5/06
[52] U.S. Cl. ......................................... 111/3; 111/34; 111/52; 221/174; 221/185; 221/254
[58] Field of Search ................... 111/2, 3, 34, 14; 214/83.36, 519; 221/172, 174, 185, 253, 254

[56] References Cited

U.S. PATENT DOCUMENTS

| 1,517,715 | 12/1924 | Geus | 111/3 X |
| 1,618,958 | 2/1927 | Kassebeer | 111/3 |
| 1,678,643 | 7/1928 | Kassebeer | 111/3 |
| 3,791,321 | 2/1974 | Tsutsumi | 111/3 |
| 3,907,135 | 9/1975 | Populin et al. | 111/3 X |
| 3,921,547 | 11/1975 | Etwell | 111/3 X |
| 3,963,138 | 6/1976 | Fowler | 111/2 X |

FOREIGN PATENT DOCUMENTS

| 111462 | 9/1940 | Australia | 111/3 |
| 651739 | 2/1929 | France | 221/254 |
| 1213015 | 3/1960 | France | 214/83.36 |
| 724435 | 2/1955 | United Kingdom | 111/3 |
| 1221406 | 2/1971 | United Kingdom | 221/172 |

Primary Examiner—Edgar S. Burr
Assistant Examiner—Steven A. Bratlie
Attorney, Agent, or Firm—Robert L. Farris

[57] ABSTRACT

Apparatus for automatically planting billets of sugar cane as produced by a chopper-type sugar cane harvester, comprises a hopper for billets, an elevator to convey billets upwards and out of the hopper, and a billet delivery chute to receive the billets from the elevator and deliver them to a furrow in the ground. The elevator has at least two series of staggered slats which meter the billets. The delivery chute has a funnel-shaped upper portion and a trough-shaped downwardly and rearwardly-sloping lower portion, which guide and channel the billets in an endwise flow towards the furrow. The lower end of the chute is positioned close to or in contact with the ground so that billets can engage the ground before they leave the chute whereby billets can build up at the lower end of the chute and be discharged into the furrow at a rate corresponding to the forward speed of the planter.

5 Claims, 12 Drawing Figures

MOBILE PLANTING APPARATUS

This invention relates to mobile planting apparatus for planting cane billets or similar rod-like crop material such as cassava.

More particularly, this invention relates to apparatus capable of automatically planting cane billets produced by a chopper-type sugar cane harvester. Such a harvester delivers the sugar cane it harvests in the form of billets produced by chopping each cane stick into two or more pieces. The billets are delivered in random orientations and it will be appreciated that it has been a considerable design problem to produce an implement which is capable of automatically, without human intervention, (and preferably with an absolute minimum of human supervision), removing billets from a tangled heap of billets produced by such a harvester and laying them in a furrow with an adequate degree of precision.

In our South African patent application No. 76/3482 there is disclosed a cane planter which we have proved is capable of meeting the above requirement. However it is felt that an even better planter would be one which was simpler and less expensive.

Other cane planters have been proposed which may possibly be capable of making an acceptable job of planting unsorted cane billets but they are all relatively complex, involving multiple conveyors extending in different directions and associated equipment and drives which make the planters heavy and expensive. Furthermore, in many cases the planters still need an operator to supervise the operation of the planter, in addition to the driver of the tractor hauling the planter.

Thus, it is an object of the present invention to provide a relatively simple automatic planter for planting unsorted cane billets or similar rod-like crop material such as cassava.

According to one aspect of the invention there is provided mobile planting apparatus for planting cane billets or similar rod-like crop material, the apparatus comprising:

a hopper to contain a supply of cane billets;

billet delivery means to deliver cane billets to a furrow in the ground; and conveyor means operable to convey billets from the hopper and to automatically feed the billets to the billet delivery means;

characterized in that the billet delivery means comprises a billet delivery chute having, in use, an upper billet-receiving end and a lower billet delivery end;

said chute having a trough-section billet guide surface extending, in use, from said billet delivery end upwards and forwards having regard to the direction of operative forward motion of the planting apparatus;

the inclination, in use, of at least the billet delivery end of the chute with respect to the horizontal, being such as to permit the billets to slide freely down the chute from the receiving end of the chute, the billets when they reach the delivery end of the chute being aligned with the longitudinal direction of the chute and sliding endwise;

the delivery end of the chute being positionable, during use, at least close enough to the soil or to a furrow therein so that the lower ends of billets sliding off the delivery end of the chute engage the ground before their upper ends leave the delivery end of the chute, whereby at least one billet can rest in the delivery end of the chute against the upper end of another billet whose lower end is in engagement with the soil, and said one billet can then be delivered to the soil in end-to-end relationship with said other billet.

The provision of billet delivery means in the form of a chute constructed and arranged as defined in the last preceding paragraph promotes a regular flow of billets to a furrow in the ground. However, it will be appreciated that the regular flow of billets to a furrow will also be promoted by a regular feed of billets from the hopper to the billet delivery means. It is an aim of another aspect of the invention to provide a planter for cane billets providing improvements in this respect.

Thus, according to another aspect of the invention there is provided mobile planting apparatus for planting cane billets or similar rod like crop material, said apparatus comprising:

a hopper to contain cane billets;

billet delivery means to deliver cane billets to a furrow in the ground; and conveyor means operable to deliver billets from the hopper to said billet delivery means; characterized in that said conveyor means comprises upwardly-extending billet elevator means providing at least part of one side wall of said hopper to contain cane billets, and said billet elevator means being operable to convey billets upwards and out of the hopper and to deliver them to said billet delivery means for deposition in a furrow in the ground, and in that anti-mass-feed means is positioned in the region of the upper end of said billet elevator means to engage excess billets carried by the billet elevator means and delay their delivery from the hopper.

Preferably the anti-mass-feed means comprises a rotor having projecting feed-back elements and a drive for the rotor, the drive being operative to rotate the rotor in the direction such that the feed-back elements move in the opposite direction to the billets on the billet elevator means when said feed-back elements are closest to the billet elevator means.

The provision of the rotor as defined in the preceding paragraph effectively increases the capacity of the hopper by preventing the mass-feed of billets out of the hopper by the non-vertical elevator even when the hopper is relatively full. The nature of cane billets is such that they very readily form tangled bundles which are moved en masse by a conveyor. If such a bundle were deposited in the billet delivery means of a planter, it could hardly be expected that regular planting would result. The rotor overcomes this problem, which would otherwise necessitate the planter to be operated with the hopper only one third full, or less.

In addition, provision of a regular feed of billets from the hopper to the billet delivery means is further promoted by constructing the billet elevator means from at least three endless chains and having at least two series of slats mounted between the chains so as to circulate with the chains, the slats of one series being staggered with respect to those of the other series so that the slats of the two series arrive at the upper end of the elevator means alternately.

Embodiments of the invention will now be described by way of example with reference to the accompanying drawings, in which.

In the embodiment of FIGS. 1 to 9 mobile cane planting apparatus 10 for planting cane billets from a chopper type sugar cane harvester is in the form of a semi-mounted implement mounted at its forward end (with respect to the direction F of operative forward motion of the planter) on the hitch links 12, 14, 16 (see FIG. 6) of an agricultural tractor 18. The rear end of the planter is supported by ground wheels 20, 22.

The principal parts of billet planter 10 are:

a hopper 24 to contain a supply of cane billets;

billet delivery means 26 comprising a billet delivery chute 28 to deliver billets to a furrow in the ground formed by a furrow opener 30; and conveyor means 32 comprising an upwardly extending billet elevator 34 operable to automatically feed billets from hopper 24 to chute 28. These principal parts will now be described in more detail.

Hopper 24 is mounted on a chassis or frame 36 carried by ground wheels 20, 22 and having a drawbar 38 at its forward end which is connected to tractor 18 in a manner to be described. Drawbar 38 is connected to chassis 36 for pivotal movement about a horizontal fore/aft axis 39. The hopper comprises an upwardly sloping front wall provided by conveyor means 32, a fixed rear wall 40 of sheet metal located opposite to the front wall and sloping downwardly towards the lower end of conveyor means 32, and two vertical side walls 42, 44 of sheet metal with associated stiffeners 45. The upper portion of each side wall is of wire mesh 45A for visibility. Thus, hopper 24 has a generally vee-shaped cross-sectional shape as seen in side elevation, defined by its front and rear walls 32, 40 respectively.

Conveyor means 32, which provides the front wall of hopper 24, comprises upwardly extending billet elevator 34. The billet elevator comprises four endless conveyor members in the form of chains 46, 48, 50, 51 between which are mounted three series 52, 54, 55 of outwardly-projecting slats 56 which move over a sheet metal billet support surface 58. The extent of the outward projection of the slats from surface 58 (i.e. their billet-carrying width) is about 38 millimeters and not significantly greater than the average thickness of a billet to be planted, whereby, in use, each slat does not, of itself, readily pick up a layer of billets more than one billet thick.

The slats 56 are all equally spaced, but the slats of the three series 52, 54, 55 are staggered with respect to each other whereby, in use, the slats arrive at the upper end 59 of billet elevator 34 alternately.

Chains 46, 48, 50, 51 and their slats 56 are arranged in an upwardly-inclined conveying run 60 and a return run 62, run 60 being the only billet conveying run of billet elevator 34 within hopper 24 since, in use, the billets are delivered from the elevator to billet delivery chute 28 at the upper end 59 of conveying run 60, and no horizontal conveying run is employed. Such a horizontal run would force-feed, and overload with billets conveying run 60.

The attitude of conveying run 60 of conveyor 34 is about 70 degrees displacement from horizontal and the preferred range of attitudes for it lies within 5 degrees on each side of this position. However a wider range of attitudes is possible to accommodate varying crop conditions, and acceptable attitudes may be found between vertical and 60 degrees displacement therefrom. The more nearly vertical the conveyor is, the less is its tendency to pick-up excessive quantities of cane, and this promotes more consistent and uniform dispensing of the cane billets by the planter. However, the more nearly vertical the conveyor is, the smaller is the capacity of hopper 24, and a satisfactory balance has to be struck between these two conflicting requirements. A screw jack device (not shown) can be provided to allow manual adjustment of the attitude of elevator 34.

In the region of upper end 58 of billet elevator 34 there is provided anti mass feed means in the form of a drum-shaped rotor 64 having four sets of four projecting feed-back elements 66 in the form of pegs, each set of pegs extending half-way along the length of the drum, and the sets being arranged alternately at opposite ends of the drum. Rotor 64 is journalled on bearings 67 carried by hopper 24 and is positioned to engage excess billets carried by elevator 34 so as to delay the delivery of these billets from hopper 24.

A drive is provided to rotate rotor 64 about its horizontal transverse axis 68 in the direction D indicated so that each feed-back element 66 moves in the opposite direction to the billets on billet elevator 34 when the feed-back element is at the point in each rotation when it is closest to the billet elevator. The drive is taken from the upper end of billet elevator 34 by a chain 70 and associated sprockets. Billet elevator 34 is itself driven from ground wheel 20 via roller chains 72, 74, a countershaft 76, and associated sprockets, at the left hand side of the planter.

In the region of the upper end 59 of elevator 34 a spray bar (now shown) can be provided, which extends across the full width of the elevator.

The spray bar is connected to a fungicide tank (not shown), a pump (not shown) driven by the power-take-off of tractor 18 and a filter (not shown), whereby all billets carried by the elevator are thoroughly sprayed with fungicide by the spray bar before they leave the hopper 24 and excess fungicide runs off the billets, is collected, filtered and returned to the tank.

Now the width 78 (see FIG. 5) of billet elevator 34, measured in a direction at right angles to the direction F of operative forward motion of the planter, is considerably greater than the width 80 of the upper end of the billet delivery chute 28, and a primary chute 82 is mounted at the upper end 59 of the elevator to guide billets falling from the elevator, into the delivery chute. The primary chute is of sheet metal, and has a generally trough-shaped cross sectional shape, and comprises a flat forwardly-tapering floor 84 and upwardly-inclined side flanges 86, 88. The forward end of the primary chute is supported on frame 36 by a stay 90 which can be adjusted relative to the primary chute by means of a row of holes 92 formed in a flange 94 at the underside of the chute. This permits the attitude of the hood to be adjusted to accommodate crop variations (e.g. wet and dry billets and varying amounts of trash therein), the angle of the chute affecting the sliding speed of the billets.

Billet delivery chute 28, its mounting and associated structures will now be described in more detail. The chute is mounted on a frame 100 which is itself mounted on the hitch links 12, 14, 16 of tractor 18. The frame is generally rectangular and comprises a horizontal transverse front beam 102 to which a bifurcated upright mast 104 is rigidly secured. Top link 16 (which is itself bifurcated) of the tractor 18's three point hitch is attached to the upper end of mast 104. Laterally spaced connectors 106 are provided on front beam 102 to receive draught links 12, 14.

Chute 28 has a pair of vertical channel-section stiffening flanges 108 welded to it, one on each side. Each flange is extended downwards by a link 110 welded to the flange. The links 110 are connected by respective aligned transverse pivot bolts 112 to respective rearwardly-projecting ears 114 welded to each side of mast 104 whereby the chute is supported on mast 104 so as to be capable of limited angular movement about a transverse pivot axis 116. A light coiled tension spring 118 (FIG. 6) is connected between chute 28 and front beam 102 of frame 100 to bias the chute in the anticlockwise direction about axis 116, as seen in FIG. 6, so that the lower, rearward, end of the chute is biased downwards towards the base of a furrow in the ground, during use.

Figure 1:
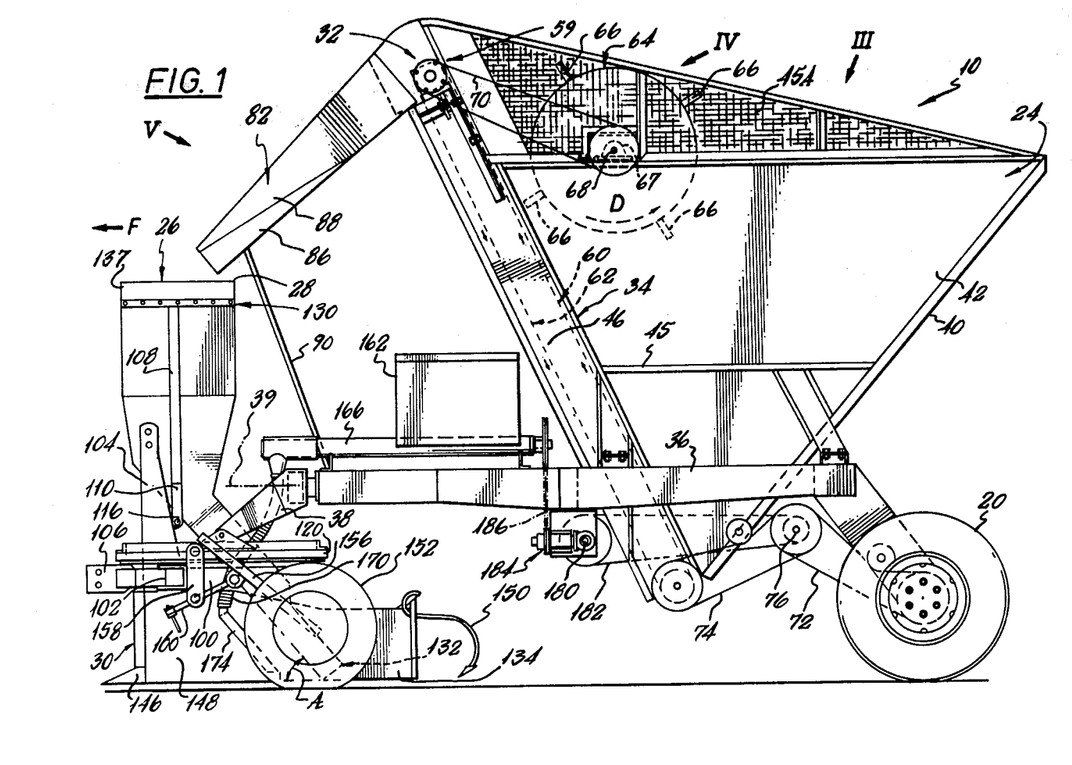
FIG. 1 shows in side elevation, mobile apparatus for planting sugar cane, the direction of viewing being from the left hand side of the planter having regard to a reference viewing direction extending forwards in the direction of operative forward travel of the planter.
Figure 2:
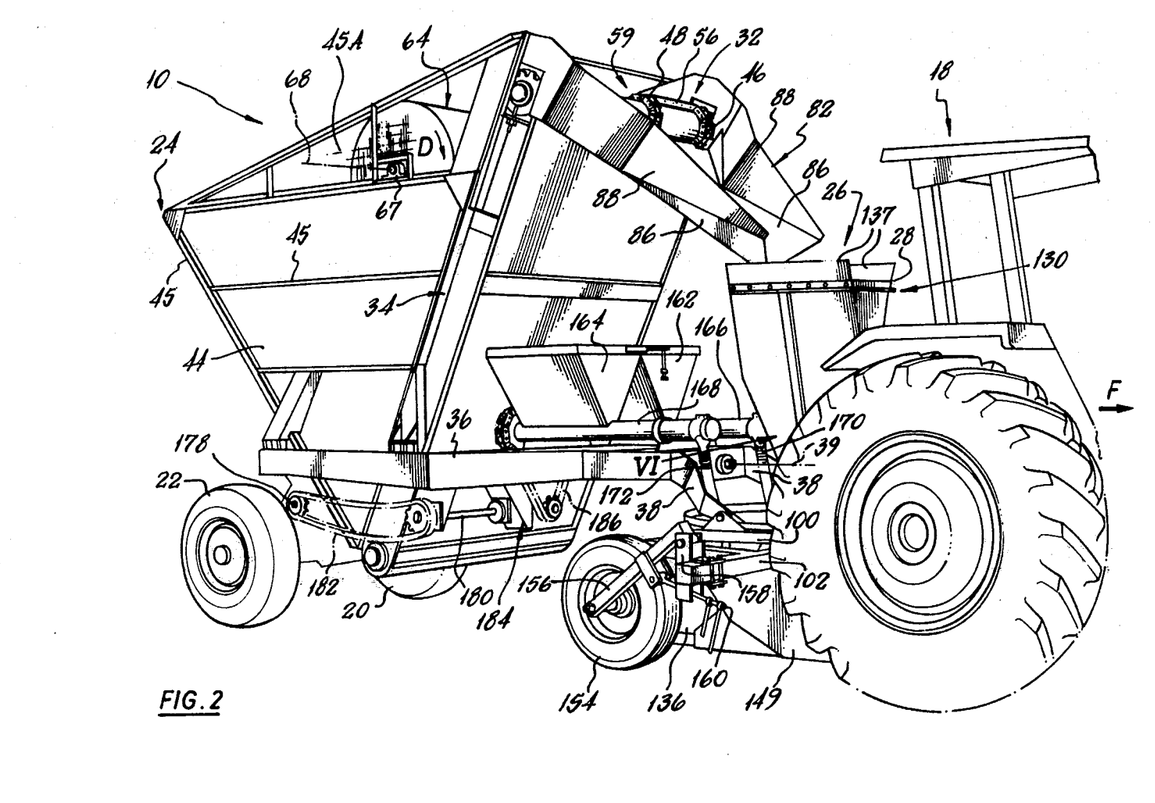
FIG. 2 shows a perspective view of the front and right hand side of the planter, the planter being shown attached to a tractor.
Figure 3:
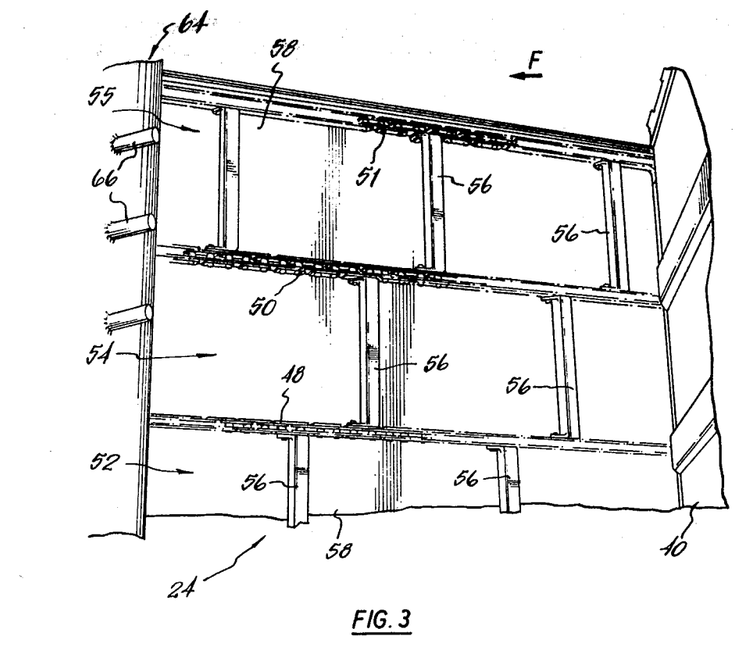
FIG. 3 shows a perspective view into a billet hopper of the planter, showing the staggered relationship of the slats of a billet elevator conveyor, and the sloping rear wall of the hopper, the direction of viewing being indicated by arrow III in FIG. 1.
Figure 4:
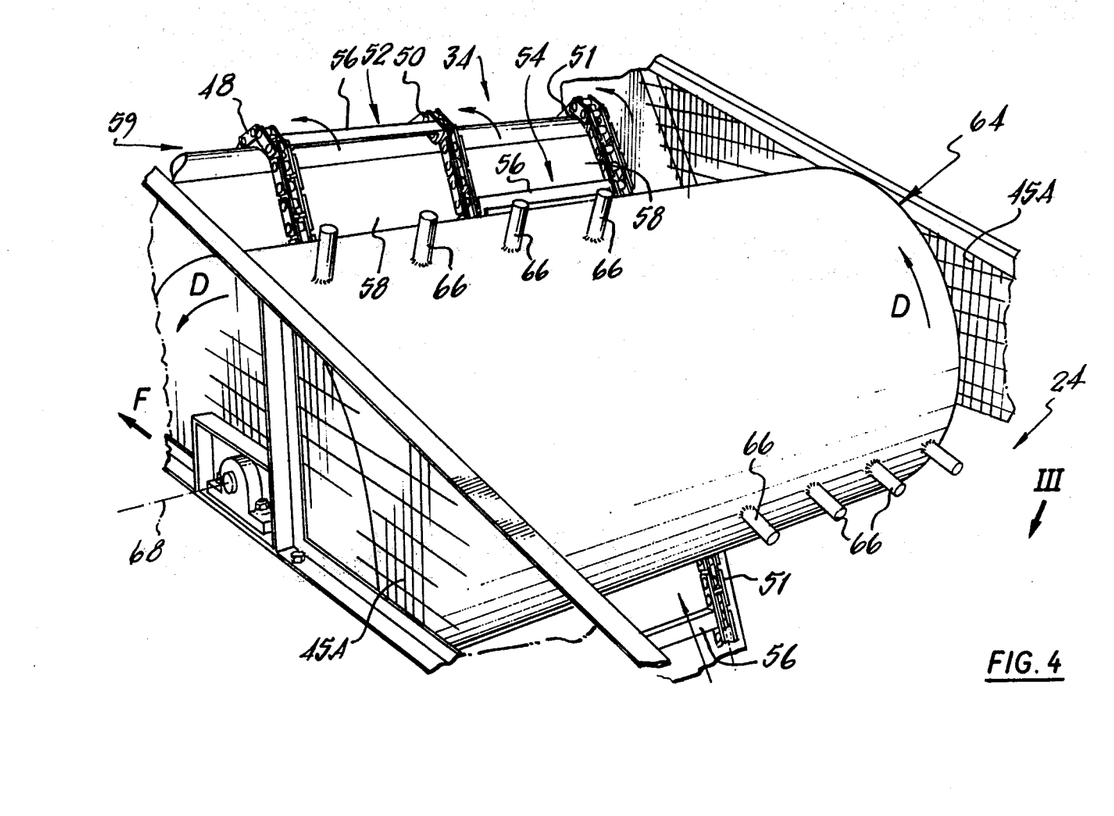
FIG. 4 shows another perspective view into the open top of the billet hopper of the planter, showing the upper end of the billet elevator conveyor together with an anti-mass-feed rotor mounted adjacent the elevator, the direction of viewing being indicated by arrow IV in FIG. 1.
Figure 5:
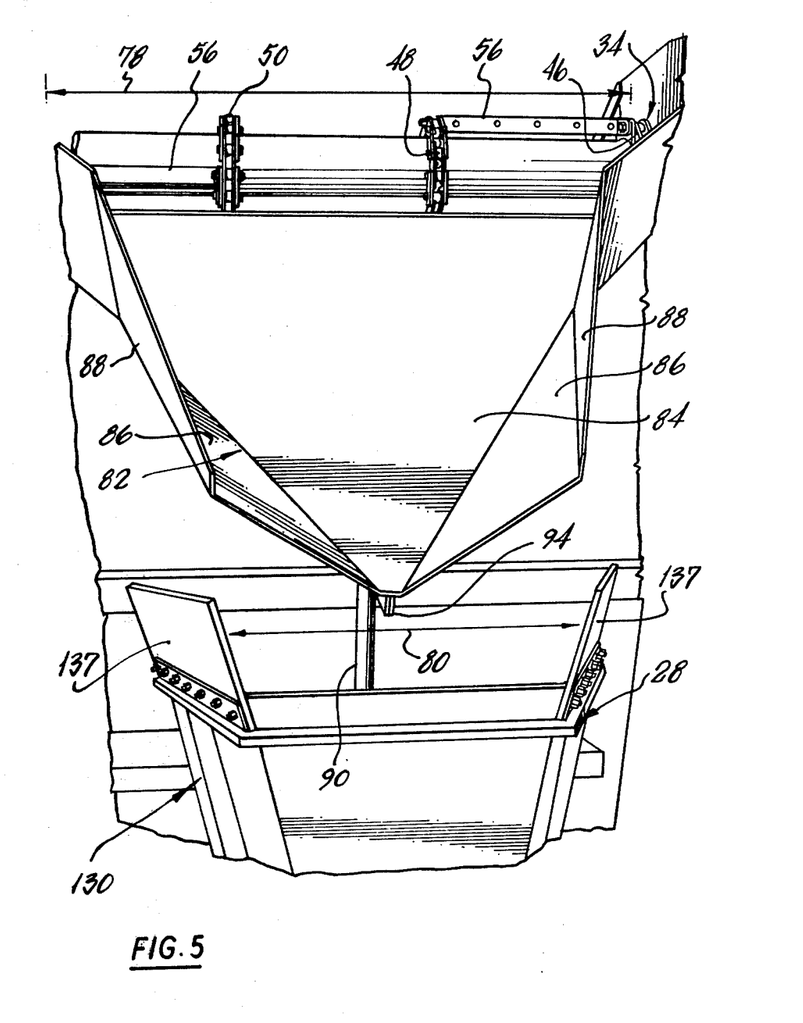
FIG. 5 shows a perspective view of the upper end of the billet elevator, and of a primary chute which guides billets falling therefrom towards a billet delivery chute, the upper end of the billet delivery chute also being seen in this drawing, the direction of viewing being indicated by arrow V in FIG. 1.
Figure 6:
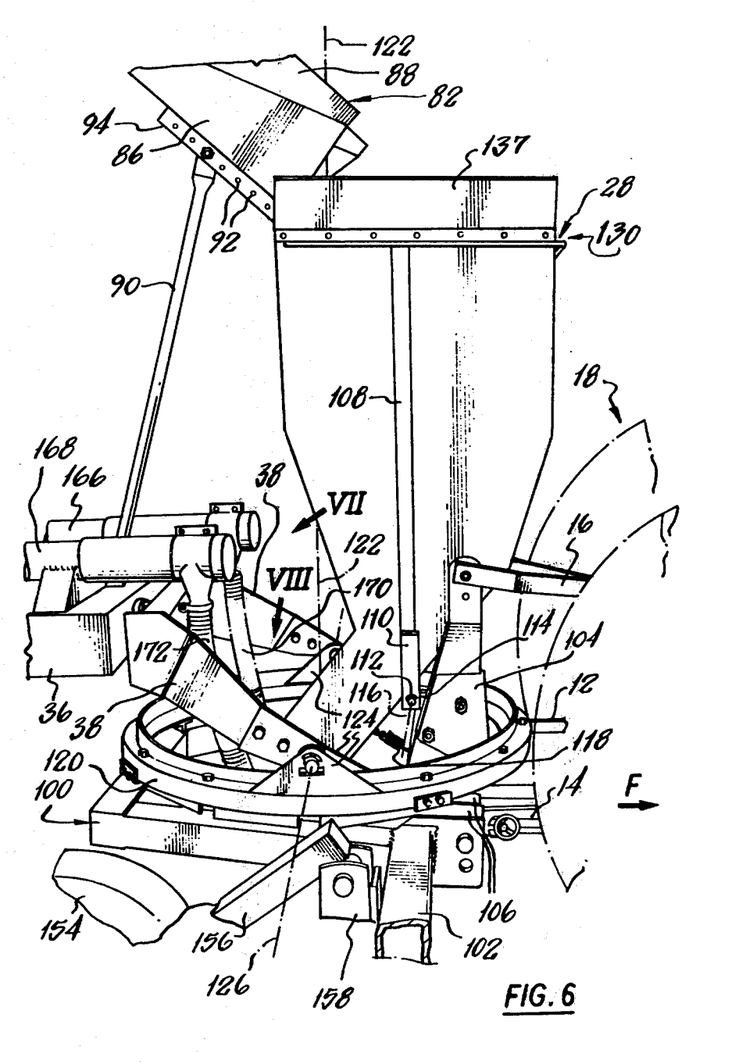
FIG. 6 is a perspective view showing the upper end of the billet delivery chute, the mounting of the chute and the connection of the billet hopper to it, the direction of viewing being indicated by arrow VI in FIG. 2.

Frame 100 carries an annular bearing or slewing ring 120, which in the working position of the planter shown in FIG. 6 is arranged with its central axis 122 extending vertically and with billet delivery chute 28 extending through the annular bearing and having its upper, billet receiving end positioned on or close to the central axes of the bearing. The forward, discharge end of primary chute 82 is likewise positioned close to axis 122.

Drawbar 38 is a generally U-shaped structure, the forward ends of the two limbs of the drawbar being connected to pairs of flanges 124 on annular bearing 120 for pivotal movement relative thereto about a common axis 126 transverse to direction F and which intersects central axis 122 of the bearing. Thus hopper 24 is trailed from frame 100 (which is mounted on the tractor's hitch links).

As regards the structure of chute 28 itself, it is formed of sheet steel and has an upper billet receiving end 130 and a lower billet delivery end 132. Billet receiving end 130 is in the form of a downwardly-tapering rectangular-section funnel positioned to receive billets from primary chute 82 and billet delivery end 132 is positionable between the vertical landsides 134, 136 of furrow opener 30 so as to lightly engage the bottom of the furrow formed by opener 30.

At the top of chute 28, two flexible flanges 137 formed of strips of rubber conveyor belting, one flange at each side, assist the guidance of billets into the chute.

Figure 7:
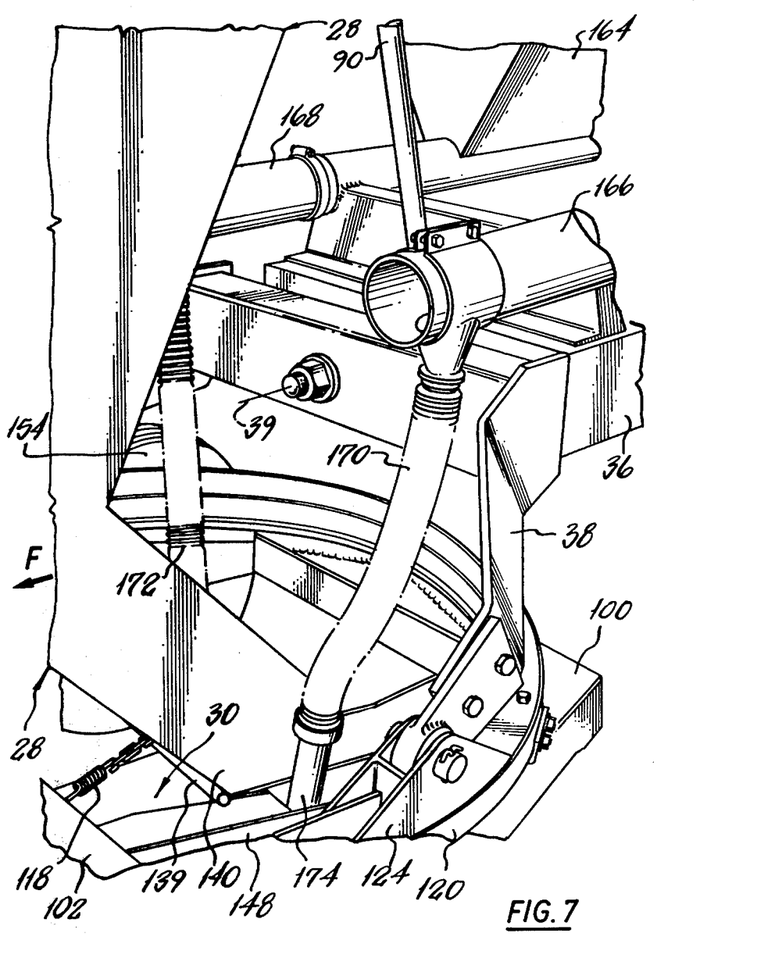
FIG. 7 shows a perspective view of a portion of the billet delivery chute and of an associated annular bearing and fertilizer delivery tubes, the direction of viewing being indicated by arrow VII in FIG. 6.
Figure 8:
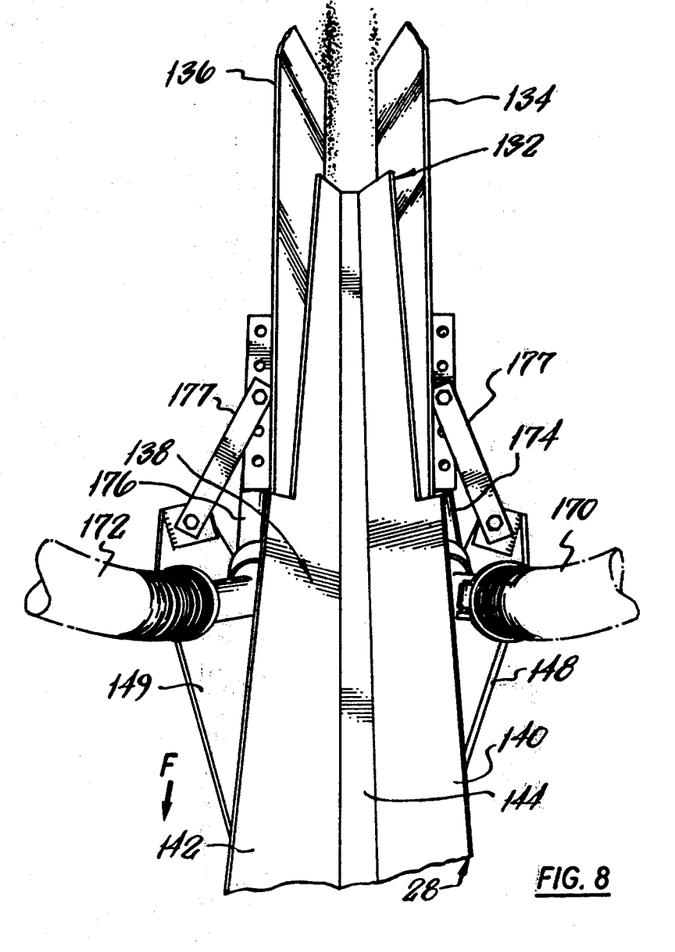
FIG. 8 shows a perspective view of the lower end of the billet delivery chute together with associated fertilizer delivery tubes, the direction of viewing being indicated by arrow VIII in FIG. 6.

A trough section billet guide surface 138, best seen in FIG. 8, is provided by chute 28 and this surface extends from billet delivery end 132 of the chute upwards and forwards with respect to direction F. As shown in FIG. 7, surface 138 is substantially linear and its angle of inclination (A) with respect to the horizontal is defined by a stop 139 on furrow opener 30 which limits pivotal movement of the chute about axis 116 in the clockwise direction. Angle A is set at a nominal value of 50 degrees at which the billets slide freely down the chute but provision can be made to make it adjustable to take account of the moisture content of the billets and other factors by 10 degrees on each side of this setting to achieve optimum planting under any particular conditions.

Trough section billet guide surface 138 is defined by a pair of downwardly-converging side walls 140, 142 and a relatively narrow flat base wall 144 between the side walls. The length of the trough section billet guide surface is at least twice the average length of a billet to be planted, in order to provide sufficient channeling and guidance to the flow of billets which passes along the downwardly and rearwardly extending chute 28.

Furrow opener 30 is mounted on frame 100 and comprises a forward coulter 146 towards which two upright forward landsides 148, 149 converge forwardly. The rearward landsides 134, 136 extend rearwards from between landsides 148, 149. At the rear end of landsides 134, 136 is mounted a furrow closing assembly comprising a pair of spring tines 150 (see FIG. 1). A trailing press wheel (not shown) may be provided to consolidate the soil behind tines 150.

It will be understood that the design and structure of the furrow opening and closing assemblies may need to be varied considerably to accommodate variations in soil conditions in different parts of the world. Such variations are illustrated by the structure shown in FIG. 9, to be described below.

A pair of pneumatic depth control wheels 152, 154 are mounted on frame 100 to control the planting depth. Each wheel is journalled on its own trailing bearing arm 156 pivoted at its forward end on a bracket 158 fixed to beam 102 of frame 100. A screw threaded adjuster 160 acting between arm 156 and the lower end of bracket 158 provides for simple manual adjustment of the height of each wheel.

A pair of vee-section fertilizer hoppers 162, 164 are mounted on chassis 36 in front of billet elevator 34.

Respective horizontal fertilizer feed-out tubes 166, 168 each containing an auger (not shown) carry fertilizer to convoluted rubber drop tubes 170, 172 which take the fertilizer downwards on each side of furrow opener assembly. A pair of placement tubes 174, 176 at the lower ends of drop tubes 170, 172 extend downwards between the rear ends of landsides 148, 149 and the forward ends of landsides 134, 136 (the latter being offset laterally inwards from the former as shown in FIG. 7) to deposit fertilizer in bands at each side of the furrow in which the cane billets are laid. The rear ends of landsides 148, 149 are supported and connected to landsides 134, 136 by adjustable links 177.

The augers in fertilizer feed-out tubes 166, 168 are driven at their rear ends from ground wheel 22 via a chain (not shown) corresponding to chain 72, counter shafts 178, 180, a chain 182 and associated sprockets, a bevel gear drive 184 and chains 186 driving sprockets at the rear ends of the auger shafts.

Use of planter 10 will now be described.

Hopper 24 is filled with unsorted billets up to the level of the bottom of rotor 64. Depth wheels 152, 154 are set at the level necessary for opener 30 to produce a furrow of the desired depth and the tractor and planter pass down the field to be planted, in the desired direction. Ground wheels 20, 22 drive elevator 34 and rotor 64 in the directions indicated and fertilizer is metered from hoppers 162, 164 in two bands at the sides of the furrow formed by opener 30.

Slats 56 of elevator 34 continually move a layer of cane billets out of hopper 24. Rotor 64 and its pegs 66 resist any tendency for a mass of tangled cane billets to be carried out of the hopper and maintain at least about 1 meter of the elevator, at its upper end, free of excess billets i.e. carrying only a layer of billets one billet thick.

This one billet thick layer of billets is delivered at the upper end of elevator 34 to billet delivery chute 28 through primary chute 82. The staggered arrangement of slats 56 in three series 52, 54, 55 promotes an even supply of billets to chute 28. This even supply is further promoted by the use of the relatively large number of slats in the elevator and the associated relatively low ratio drive from ground wheel 20 to the elevator. The drive to the elevator from the ground wheel is constant throughout the planting operation, no supervision of the billet feed being required, such as occasional operation of a clutch to interrupt the drive to the billet elevator. The drive to the elevator from ground wheel 20 ensures that the planting rate (that is to say, the quantity of cane billets deposited per unit length of furrow) is unaffected by planter ground speed.

At the upper end of elevator 34, the spray bar (not shown) thoroughly doses the billets with fungicide, and they are then discharged into primary chute 82 and as they slide down the chute, they begin to be aligned in direction F of operative forward motion of the planter, and fall into the billet receiving end 130 of chute 28.

Billet receiving end 130 of chute 28 funnels the billets towards the trough-section billet guide surface 138 of the delivery end 132 of the chute, by which time the billets are all aligned generally lengthwise of the chute and sliding endwise.

Now the rate of delivery of billets to chute 28 is arranged to be some what greater than would be needed in order to produce a single line of billets arranged end to end in the furrow. Consequently the billets build-up at the delivery end 132 of the chute and tend to back-up in the chute, end to end, and possibly (depending on the rate of billet feed) in more than one layer.

Because the bottom end of chute 28 is positioned at or close to the bottom of the furrow in the ground and is inclined at the angle stated, the billets at the bottom end of the chute are resting on the ground but leaning on the chute. Therefore as the planter moves forwards, the billets slide out of the chute at a rate corresponding to the forward speed of the planter and are thereby laid end-to-end in the furrow. If two or more layers of billets have been built-up in the chute then two or more layers of billets are deposited in the furrow. Thus the trough section chute and its disposition relative to the ground (i.e. to the furrow) helps eliminate gaps in the cane billet distribution pattern by permitting build-up of excess billets in the chute (which make good any irregularities in the supply of billets to the chute), and by the fact that the delivery rate of billets from the chute to the furrow is controlled by the ground speed of the planter.

It will be appreciated that as the tractor 18 turns relative to planter 10 during planting then the alignment of primary chute 82 with the billet receiving end 130 of chute 28 is maintained since articulation of the planter relative to the tractor takes place about the axis 122 of annular bearing 120 and the primary chute discharges its billets into chute 28 close to this axis.

The principal advantages provided by the above embodiment of the invention include the following:

1. simplicity of structure—hence the planter is economical to make, operate and maintain, furthermore its very simplicity makes it reliable in operation;

2. billet handling steps kept to a minimum—thereby minimizing damage to the billets;

3. capable of planting sufficient billets per unit length of furrow to avoid gaps in the cane rows. More cane is needed per unit length of furrow when planting billets than when planting whole stick cane (because not all billets "strike" and produce a cane plant) and this planter can easily place this quantity of billets even at relatively high ground speeds. Complex planters which pick up billets individually usually cannot meet this requirement;

4. the planter is a once-over machine. In one pass through the field it opens the furrow, applies fertilizer places the billets, closes the furrow and consolidates the soil, and all this is achieved with a single operator—the tractor driver;

5. the rate of billet placement in the furrow is self-regulating according to the ground speed of the planter, as a result of the attitude and position of delivery end of the billet delivery chute whereby any irregularity in the feed of billets by elevator 34 is automatically made good;

6. the planter is able to accommodate variations in billet length—whereas certain other proposed automatic planters require billets of a standard size for reliable operation;

7. automatic operation—many planters require numerous operators. This planter requires no operators itself, just a driver for the tractor;

8. the pivotal mounting of the billet delivery chute allows ground contours to be accommodated and promotes free billet flow.

Figure 9:
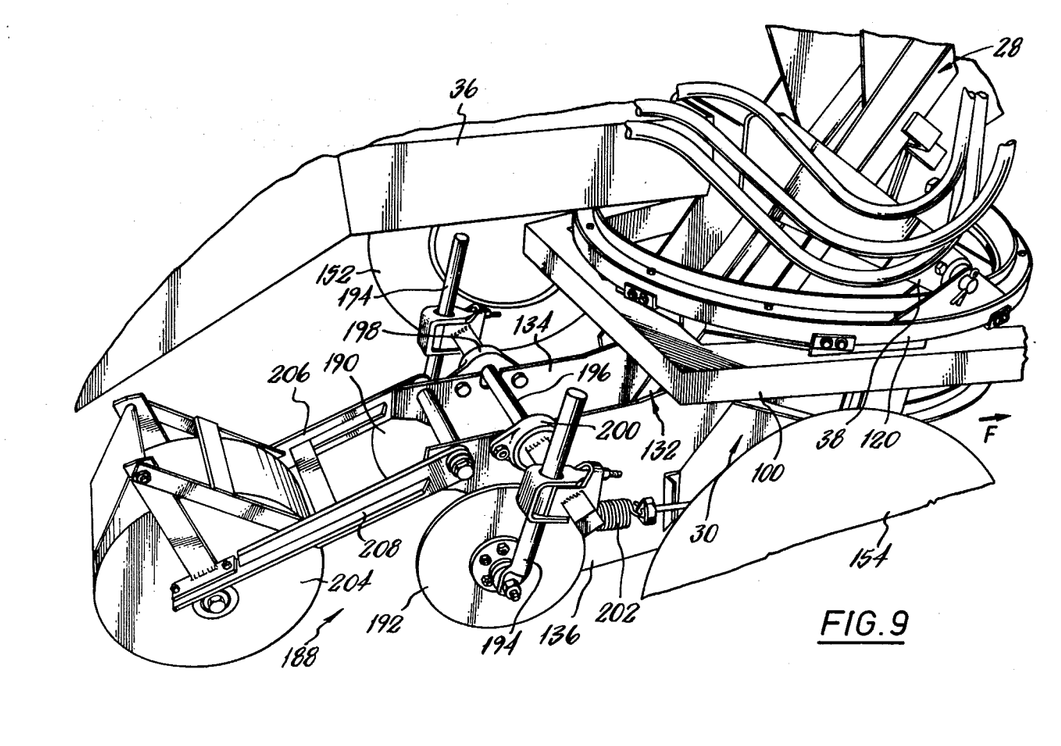
FIG. 9 shows a perspective view of the lower end of the billet delivery chute and its associated furrow-opening and furrow-closing assemblies, the furrow closing assembly shown in this Figure being different from that seen in FIG. 1.

FIG. 9 shows part of a planter, otherwise similar to that of FIGS. 1 to 8, but incorporating a modified furrow closing assembly 188. FIG. 9 also further illustrates the relationship of the billet delivery chute 28 to the furrow opener 30. These and other items in FIG. 9 which are substantially the same as in FIGS. 1 to 8 are given the same reference numerals as in the previous Figures.

Furrow closing assembly 188 comprises a pair of discs 190, 192 journalled on adjustable legs 194 which are themselves clamped to a pivot shaft 196 journalled in bearings 198, 200 on landsides 134, 136. Coiled springs 202 resiliently hold the discs in their working positions. A press wheel 204 journalled on arms 206, 208 pivotally mounted on the rear ends of landsides 134, 136 is provided to consolidate the soil over the planted cane.

Figure 10:
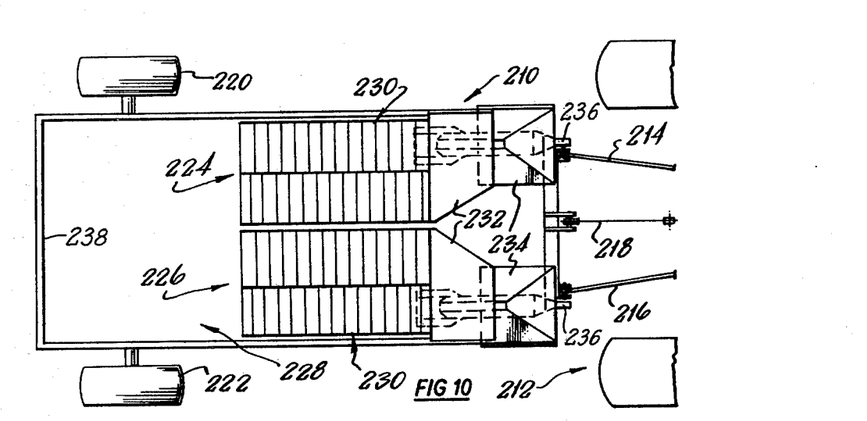
FIG. 10 shows a diagrammatic plan view of a further embodiment capable of planting two rows of cane simultaneously.

The embodiment of FIG. 10 is in many respects similar to that of FIGS. 1 to 8 and attention will only be particularly drawn to the differences.

In FIG. 10, a planter 210 drawn by a tractor 212 is constructed and arranged so as to plant two rows of cane simultaneously.

Planter 210 is semi-mounted, being supported at its forward end on the hitch links 214, 216, 218 of tractor 212 and at its rear end on ground wheels 220, 222.

Two planter row units 224, 226 are provided on planter 210 which take their billets from a single hopper 228. Each row unit is constructed and arranged in substantially the same way as the single row unit of the embodiment of FIGS. 1 to 4, having a billet elevator 230 (corresponding to elevator 34, a primary chute 232 (corresponding to primary chute 82), and a billet delivery chute 234 (corresponding to chute 28).

Anti-mass feed means (not shown) is provided in the form of a double length rotor, otherwise similar to rotor 64 of the embodiment of FIGS. 1 to 8.

In the FIG. 10 embodiment, the billet delivery chutes 234 and furrow openers 236 are mounted on a frame carried by hitch links 214, 216, 218 as in the previous embodiment but without the provision of a slewing ring. Hopper 228 is trailed from the frame, thus introducing a limit on the radius of curvature through which tractor and planter can turn during planting while providing acceptable alignment of chutes 232 and 234.

It should be noted that no partition is provided in hopper 228 between row units 224 and 226. Rear wall 238 is arranged and positioned like rear wall 40 of the previous embodiment and billets are picked up by elevators 230 until the hopper is empty.

Figure 11:
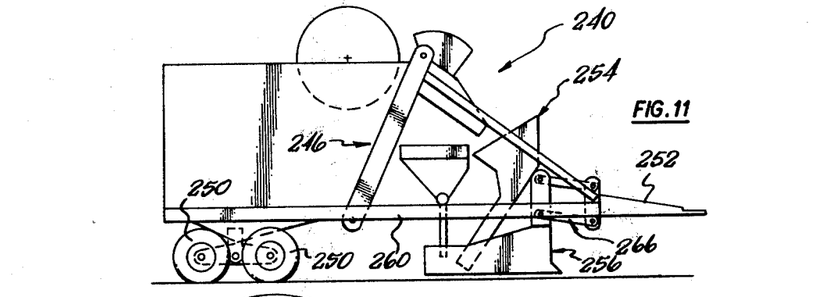
FIGS. 11 and 12 are diagrammatic side elevation and plan views respectively showing a three row cane planter constituting a further embodiment of the invention.
Figure 12:
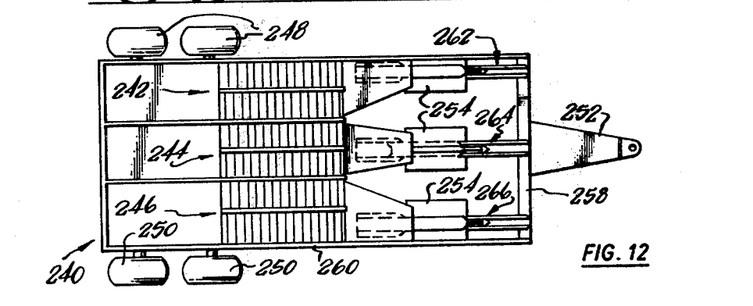

In the embodiment of FIGS. 11 and 12, the planter 240 has three row units 242, 244, 246 to plant three rows of cane simultaneously. Each row unit is constructed and arranged substantially as in the two previous embodiments and is therefore not described further. However, the planter is arranged as a fully trailed implement, mounted on two pairs of tandem ground wheels 248, 250 and drawn by means of a drawbar 252.

The billet delivery chutes 254 and furrow opener assemblies 256 of the three row units are all mounted on a toolbar 258 at the front end of the chassis or frame 260 of the planter by means of freely pivoted trailing parallelogram linkages 262, 264, 266.

In this embodiment, the alignment of the billet elevators with their chutes 254 is maintained at all times because the whole structure of each row unit is entirely mounted on the planar frame 260. Some of the weight of the planter 240 is transferred by drawbar 252 to the rear wheels of a tractor drawing the planter, in order to improve traction of this relatively large implement.

Among modifications which could be made in the above embodiments but which nevertheless fall within the scope of the invention are the following:

1. the use of alternative forms of anti-mass-feed device in place of rotor 64, such as chain-type raking devices. Alternatively, under some conditions rotor 64 could be dispensed-with;

2. modifications can be made in the details of the mounting of the billet discharge chute. The chute could be rigidly mounted either in contact with the furrow bottom, or above it at a distance of up to half the average length of a billet to be planted (i.e. up to about 20 centimeters or somewhat more)—so that the lower ends of billets sliding off the delivery end of the chute engage the soil before their upper ends leave the delivery end of the chute. This has the result that at least one billet can rest in the delivery end of the chute against the upper end of another billet whose lower end is in engagement with the soil, and said one billet can then be delivered to the soil in end-to-end relationship with the other billet. Adjustment means may be provided for adjusting the height of the billet delivery end of the chute with respect to the soil;

3. as regards the attitude of the billet delivery chute, possible values of angle A (FIG. 1) lie between 30 and 80 degress with respect to the horizontal, but the preferred range is between 40 and 60 degrees from the horizontal. Adjustment means could be provided whereby the inclination of at least the billet delivery end of the chute with respect to the horizontal, could be adjusted.

I claim:

1. A mobile planting apparatus characterized by a frame including a rear main frame section, a front frame section and pivot means connecting the front frame section to the rear main frame section including a vertical pivot means and a horizontal fore and aft pivot means; ground engaging wheels attached to the rear main frame section; hitch means attached to the front frame section; a furrow opener attached to the front frame section; a billet supply hopper mounted on the rear main frame section with a billet elevator conveyor forming at least a portion of one wall of the billet supply hopper; and a billet delivery and alignment chute means including a primary billet delivery and alignment chute with an upper end mounted on the upper end of the billet elevator conveyor, a generally flat downwardly and forwardly inclined floor with decreasing width from the upper end, side flanges inclined upwardly and outwardly from each side of at least a portion of the downwardly inclined floor and a lower exit end of the primary billet delivery and alignment chute positioned adjacent a vertical axis formed by the vertical pivot means, and a downwardly and rearwardly inclined secondary billet delivery and alignment chute mounted on the front frame section with an upper end adjacent the lower exit end of the primary billet delivery and alignment chute and a lower end adjacent the furrow opener.

2. The mobile planting apparatus of claim 1 characterized by the pivot means connecting the front frame section to the rear main frame section including a horizontal transverse pivot means.

3. The mobile planting apparatus of claim 1 characterized by the furrow opener including landslides supported on the frame adjacent the delivery end of the billet delivery and alignment chute means.

4. The mobile planting apparatus of claim 1 characterized by the billet elevator conveyor including an anti mass feeding means mounted on the billet supply hopper.

5. The mobile planting apparatus of claim 4 characterized by the anti mass feeding means including a drum-shaped rotor, with outwardly projecting feed back elements, rotatably journaled on the billet supply hopper.

* * * * *